United States Patent

Stolzer et al.

[15] 3,705,927

[45] Dec. 12, 1972

[54] ALKYL- OR ARYL-THIOLPHOSPHONIC ACID O-ALKYL-S-(N,N-DI-SUBSTITUTED AMINO CARBAMYL)-M ETHYL ESTERS

[72] Inventors: Claus Stolzer, Wuppertal-Elberfeld; Igeborg Hammann; Gunther Unterstenhofer, both of Leverkusen, all of Germany

[73] Assignee: Farbenfabriken Bayer Aktiengesellschaft, Leverkusen, Germany

[22] Filed: April 20, 1970

[21] Appl. No.: 30,311

[30] Foreign Application Priority Data

April 23, 1970 Germany..........P 19 20 504.0

[52] U.S. Cl. .................260/923, 260/487, 260/544, 260/561 H, 260/941, 260/984, 424/211

[51] Int. Cl..............................C07f 9/40, A01n 9/36
[58] Field of Search......................260/923

[56] References Cited

UNITED STATES PATENTS 3,518,327  6/1970  Fearing......................260/923

*Primary Examiner*—Lewis Gotts
*Assistant Examiner*—Anton H. Sutto
*Attorney*—Burgess, Dinklage & Sprung

[57] ABSTRACT

Alkyl- or aryl-thiolphosphonic acid O-alkyl-S-(N,N-disubstituted amino carbamyl)-methyl esters, which possess arthropodicidal, especially acaricidal and insecticidal, properties, and which may be produced by conventional methods.

8 Claims, No Drawings

ALKYL- OR ARYL-THIOLPHOSPHONIC ACID O-ALKYL-S-(N,N-DI-SUBSTITUTED AMINO CARBAMYL)-METHYL ESTERS

The present invention relates to and has for its objects the provision of particular new alkyl- or aryl-(thiono)thiolphosphonic acid-O-branched alkyl or cycloalkyl-S-(N,N-dialkyl- or di-alkenyl-amino carbamyl)-methyl esters, which possess arthropodicidal especially insecticidal and acaricidal, properties, active compositions in the arthropodicidal, of mixtures of such compounds with solid and liquid dispersible carrier vehicles, and methods for producing such compounds and for using such compounds in a new way especially for combatting pests, e.g., arthropods, especially insects and acarids, with other and further objects becoming apparent from a study of the within specification and accompanying examples.

It is known (see Belgian Pat. specification No. 579,855 as well as U.S.S.R. Pat. specification Nos. 181,441, 185,913 and 191,265) that O,O-dialkylthiolphosphoric acid S-(N,N-dialkylaminocarbamyl)-methyl esters and their thionothiol analogues exhibit insecticidal and acaricidal activity.

It has further become known that, in general, O,O-dialkyl-(thiono)thiolphosphoric acid S-(hydrazidocarbonyl)-methyl esters and alkyl-(thiono)thiolphosphonic acid O-alkyl-S-(hydrazidocarbonyl)-methyl esters possess insecticidal and acaricidal activity (see Belgian Pat. specification No. 713,363).

The present invention provides alkyl or aryl-thiolphosphonic acid O-alkyl-S-(N,N-dialkylaminocarbamyl)-methyl esters wherein the O-alkyl is a branched alkyl or an O-cycloalkyl group, and their thionothiol analogues, of the general formula.

$$R'O-\underset{\underset{R}{\overset{X}{\|}}}{P}-S-CH_2-\underset{\underset{O}{\|}}{C}-NH-N\underset{R'''}{\overset{R''}{}} \quad (I)$$

in which
R stands for optionally halogen-substituted lower alkyl, or for aryl, optionally substituted by a halogen or lower alkyl radical,
R' stands for branched alkyl or cycloalkyl,
R'' and R''' stand for lower alkyl or alkenyl and
X stands for oxygen or sulphur.

Preferably, R stands for alkyl with 1–4 carbon atoms which may be substituted by chlorine or for phenyl which may be substituted by chlorine, bromine or lower alkyl; R' stands for branched alkyl with 3–6 carbon atoms (such as isopropyl, isobutyl, sec.-butyl, tert.-butyl or isoamyl) or for cycloalkyl (preferably cyclohexyl)- and R'' and R''' stand for alkyl with 1–3 carbon atoms.

The present invention also provides a process for the production of a compound according to the invention in which
a. an alkali metal salt, alkaline earth metal salt or ammonium salt of an alkyl- or aryl-mono- or di-thiophosphonic acid O-alkyl ester of the general formula $$R'O-\underset{\underset{R}{\overset{X}{\|}}}{P}-SM \quad (II)$$

in which
R,R' and X have the meanings stated earlier above, and
M stands for an alkali metal or alkaline earth metal equivalent or an ammonium group is reacted with a haloacetic acid phenyl ester of the formula $$Hal-CH_2C\underset{O-Ph}{\overset{\overset{O}{\|}}{}} \quad (III)$$

in which
Hal stands for chlorine or bromine, and
Ph stands for optionally substituted phenyl to form an alkyl- or aryl-(thiono)thiolphosphonic acid O-alkyl-S-(carbophenoxy)-methyl ester of the general formula $$R'O-\underset{\underset{R}{\overset{X}{\|}}}{P}-S-CH_2-\underset{\underset{O}{\|}}{C}-O-Ph \quad (IV)$$

in which
R,R', X and Ph have the meanings stated earlier above and the ester of the formula (IV) is aminolyzed by means of a N,N-dialkylhydrazine of the general formula $$H_2N-N\underset{R'''}{\overset{R''}{}} \quad (V)$$

in which
R'' and R''' have the meanings stated above, or
b. an alkali metal salt, alkaline earth metal salt or ammonium salt of the formula (II) is reacted with a haloacetic acid, N,N-dialkylhydrazide of the general formula $$Hal-CH_2-\underset{\underset{NH-N\underset{R'''}{\overset{R''}{}}}{\overset{\overset{O}{\|}}{}}}{C} \quad (VI)$$

in which
Hal, R'' and R''' have the meanings stated earlier above, or
c. an alkali metal salt, alkaline earth metal salt or ammonium salt of the general formula (II) is reacted in a one-pot reaction with haloacetyl halide of the general formula $$Hal-CH_2-\underset{Hal}{\overset{\overset{O}{\|}}{C}} \quad (VII)$$

in which
Hal has the meaning as stated after which an N,N-dialkylhydrazine (V), and optionally an acid-binding agent, is added to the reaction mixture, or
d. an alkyl- or aryl-(thiono)phosphonic acid O-alkyl ester halide of the general formula $$R'O-\underset{\underset{R}{\overset{X}{\|}}}{P}-Hal \quad (VIII)$$

in which

R,R',X and Hal have the meanings stated earlier above
is reacted, in the presence of an acid-binding agent, with a mercaptoacetic acid N',N'-dialkylhydrazide of the general formula

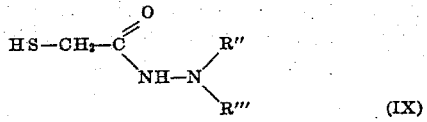

in which
R'' and R''' have the meanings stated earlier above.

Surprisingly, those alkyl- and aryl-(thiono)thiolphosphonic acid O-alkyl-S-(N,N-dialkylaminocarbamyl)-methyl esters which possess a branched O-alkyl or an O-cycloalkyl group show considerably better insecticidal and acaricidal as well as systemic activity than the O,O-dialkyl-(thiono)thiolphosphoric acid S-(hydrazidocarbonyl)-methyl esters and alkyl-(thiono) thiolphosphonic acid O-alkyl-S-(hydrazidocarbonyl)-methyl esters known from the prior art which are the closest known active compounds of the same type of activity. The substances according to the invention therefore represent an enrichment of the art.

As an illustration of the first step of process variant (a) the reaction of the potassium salt of O-isopropylethyldithiophosphonic acid and chloroacetic acid phenyl ester can be represented by the following formula scheme:

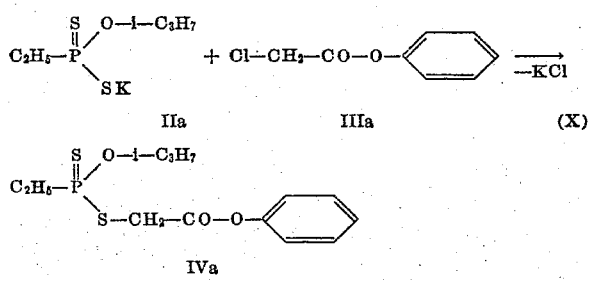

In the second reaction step, the ester IVa obtained above is reacted with N,N-dimethylhydrazine in accordance with the following reaction scheme:

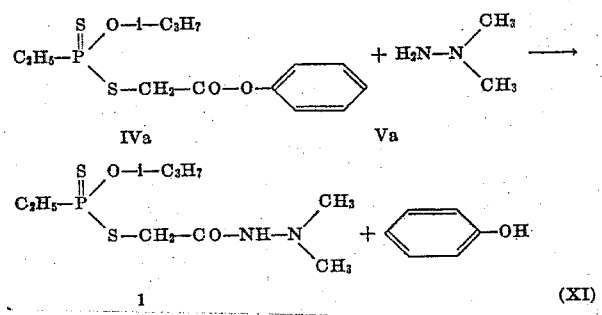

The phenol liberated is removed by washing with a solution of alkali. The process variants (b), (c) and (d) can be formulated in corresponding manner.

The alkali metal salts, alkaline earth metal salts or ammonium salts required for the preparation of the substances according to the invention according to process variants (a), (b) and (c) are generally defined by the above formula (II).

The N,N-dialkylhydrazines required in process variants (a) and (c) are defined by formula (V).
In the formulas (III), (VII), and (VIII) Hal stands preferably for chlorine or bromine.
The starting materials (II), (III), (V), (VI), (VII), (VIII) and (IX) are known.

For the preparation of the substances according to the invention process variant (a) is particularly suitable. Here, in the first reaction step approximately equimolar amounts of salts of the formula (II) and chloro- or bromo- acetic acid phenyl ester may be reacted. In individual cases, it has proved expedient to use the salts of the formula (II) in excess. The reaction normally takes place at 0° to 100°C, preferably 20° to 70°C. The reaction may be effected in the presence of a solvent, and for this purpose all organic solvents inert under the conditions of the reaction are suitable, especially those of polar nature, such as alcohols, ketones, acetonitrile and water. The isolation of the intermediate products of the formula (IV) may take place. This may be done (if water is not already used as solvent) by pouring the reaction mixture into water, taking up the oily product of the formula (IV) in a water-immiscible solvent, such as benzene, toluene, dichloromethane or ether, washing until there is a neutral reaction, drying the organic phase, filtering off and concentrating the filtrate. The product of formula (IV) may then be reacted, in a second reaction step, generally at a temperature of 0° to 100°C, preferably 20° to 40°C, with a N,N-dialkylhydrazine of the formula (V) normally in molar ratio of approximately 1:2. An excess of N,N-dialkylhydrazine is necessary for quantitive aminolysis. As solvents, again all solvents inert to the reactants are suitable, preferably chlorinated aliphatic hydrocarbons, for example, di- and tri-chloromethane. In many cases, however, it is advantageous to dispense entirely with solvents in the aminolysis. To isolate the active compounds according to the invention of the formula (I), the reaction mixture, in the solvent, may be freed of the formed phenol by washing with water and a dilute solution of alkali, the organic phase may be dried, the drying agent filtered off, and the filtrate concentrated.

The substances according to the invention are systemic insecticides and acaricides of strong potency. In particular, there are numerous insects and mites which are resistant to conventional insecticidal agents which can be controlled with them. In addition, some of the products possess a certain rodenticidal activity. The pesticidal effect sets in rapidly and is long-lasting. The products may therefore be used with success in crop protection and in the protection of stored products, as well as in the hygiene field, for the control of noxious sucking and biting insects, Diptera and mites (Acari).

To the sucking insects there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the current gall aphid (*Cryptomyzus korschelti*), the mealy apple aphid (*Sappaphis mali*), the mealy plum aphid (*Hyalopterus arundinis*) and the cherry blackfly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrate*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipenctatus;* and the like.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and the cotton worm (*Prodenia litura*), the ermine moth (*Ephestia Kuhniella*) and greater wax moth (*Galleria mellonella*); and the like.

Also to be classed with the biting insects are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamesis*), and also species living in the soil, for example wireworms (*Agriotes spec.*) and larvae of the cockchafer (*Melonlontha melonlontha*); cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta;* further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*), and the like.

With the mites (Acari) there are classed, in particular, the spider mites (Tetranychidae) such as the two-spotted spider mite (*Tetranychus telarius* = *Tetranychus althaeae* or *Tetranychus urticae*) and, the European red mite (*Paratetranychus pilosus* = *Panonychus ulmi*), blister mites, for example the currant blister mite (*Eriophyes ribis*) and tarsonemids, for example the broad mite (*Tarsonemus pallidus*); finally, ticks, such as the relapsing fever tick (*Ornithodorus moubata*); and the like.

When applied against household pests and pests of stored products, particularly flies and mosquitoes, the compounds of the invention are also distinguished by an outstanding residual effect on wood and clay as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols, (e.g., glycol monomethyl ether, etc.), amides (e.g., dimethyl formamide, etc.), sulfoxides (e.g., dimethyl sulfoxide, etc.), ketones (e.g., acetone, etc.) and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide esters of fatty alcohols, alkyl sulfonates, aryl sulfonates, etc., and especially alkyl arylpolyglycol ethers, magnesium stearate, sodium oleate, etc.): and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct applications or field application generally contemplate those in which the active compound is present in an amount substantially between about 0.00001–20 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.00001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

Furthermore, the present invention contemplates methods of selectively killing, combatting or controlling pests, e.g., arthropods, i.e., insects and acarids, and more particularly methods of combatting at least one of insects and acarids which comprises applying to at least one of correspondingly (a) such insects, (b) such acarids, and (c) the corresponding habitat thereof, i.e., the locus to be protected, a correspondingly combative or toxic amount, i.e., an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella Test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage: 100 percent means that all the caterpillars are killed whereas 0 percent means that none of the caterpillars are killed.

The active compounds, the concentrations of the active compounds, the evaluation times and the results can be seen from Table 1.

TABLE 1

(plant-damaging insects)

(Plutella test)

| Active compound | Concentration of active compound in percent | Degree of destruction in percent after 3 days |
|---|---|---|
| $(C_2H_5O)_2\overset{S}{\underset{\|}{P}}-S-CH_2-\overset{O}{\underset{\|}{C}}-NH-N(CH_3)_2$ (known) (A) | 0.1 | 0 |
| $\begin{matrix} C_2H_5 \\ \diagdown \\ \phantom{X} \\ \diagup \\ C_2H_5O \end{matrix} \overset{S}{\underset{\|}{P}} -S-CH_2-\overset{O}{\underset{\|}{C}}-NH-N(CH_3)_2$ (known) (B) | 0.1<br>0.01 | 100<br>50 |
| $\begin{matrix} \langle H \rangle - O \\ \diagdown \\ \phantom{X} \\ \diagup \\ C_2H_5 \end{matrix} \overset{S}{\underset{\|}{P}} -S-CH_2-\overset{O}{\underset{\|}{C}}-NH-N(CH_3)_2$ | 0.1<br>0.01 | 100<br>100 |

TABLE 1—Continued (plant-damaging insects)

(Plutella test)

| Active compound | Concentration of active compound in percent | Degree of destruction in percent after 3 days |
|---|---|---|
| (2) $\begin{array}{c}CH_3\diagdown \\ \phantom{CH_3}\phantom{/}P\\ i\text{-}C_3H_7O\diagup\end{array}\!\!\!\!\overset{O}{\underset{\|}{}}\!-S-CH_2-\overset{O}{\underset{\|}{C}}-NH-N(CH_3)_2$ | 0.1<br>0.01 | 100<br>100 |
| (3) $\begin{array}{c}C_2H_5\diagdown \\ \phantom{C_2H_5}\phantom{/}P\\ (CH_3)_2CH-CH_2-O\diagup\end{array}\!\!\!\!\overset{S}{\underset{\|}{}}\!-S-CH_2-\overset{O}{\underset{\|}{C}}-NH-N(CH_3)_2$ | 0.1<br>0.01 | 100<br>100 |
| (4) $\begin{array}{c}CH_3\\ \diagdown\\CH-O\\ C_2H_5\diagup\phantom{xx}\diagdown\\ \phantom{xxxxx}P\\ \phantom{xxxx}\diagup\\ \phantom{xxx}C_2H_5\end{array}\!\!\!\overset{S}{\underset{\|}{}}\!-S-CH_2-\overset{O}{\underset{\|}{C}}-NH-N(CH_3)_2$ | 0.1<br>0.01 | 100<br>100 |
| (5) | | |

EXAMPLE 2

Myzus Test (Contact Action)

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentration of the active compounds, the evaluation times and the results can be seen from Table 2.

TABLE 2

(Plant-damaging insects)

(Myzus test)

| Active compounds | Concentration of active compound in percent | Degree of destruction in percent after 24 hours |
|---|---|---|
| $(C_2H_5O)_2\overset{S}{\underset{\|}{P}}-S-CH_2-\overset{O}{\underset{\|}{C}}-NH-N(CH_3)_2$ <br>(known) (A) | 0.1<br>0.01<br>0.001 | 95<br>30<br>0 |
| $\begin{array}{c}C_2H_5\diagdown \\ \phantom{C_2H_5}\phantom{/}P\\ C_2H_5O\diagup\end{array}\!\!\!\overset{S}{\underset{\|}{}}\!-S-CH_2-\overset{O}{\underset{\|}{C}}-NH-N(CH_3)_2$ <br>(known) (B) | 0.1<br>0.01<br>0.001<br>0.0001 | 100<br>100<br>40<br>0 |
| $\begin{array}{c}CH_3\diagdown \\ \phantom{CH_3}\phantom{/}P\\ i\text{-}C_3H_7O\diagup\end{array}\!\!\!\overset{O}{\underset{\|}{}}\!-S-CH_2-\overset{O}{\underset{\|}{C}}-NH-N(CH_3)_2$ <br>(3) | 0.1<br>0.01<br>0.001<br>0.0001 | 100<br>100<br>99<br>75 |
| $\begin{array}{c}C_2H_5\diagdown \\ \phantom{C_2H_5}\phantom{/}P\\ i\text{-}C_3H_7O\diagup\end{array}\!\!\!\overset{S}{\underset{\|}{}}\!-S-CH_2-\overset{O}{\underset{\|}{C}}-NH-N(CH_3)_2$ <br>(1) | 0.1<br>0.01<br>0.001<br>0.0001 | 100<br>100<br>100<br>30 |
| $\begin{array}{c}C_2H_5\diagdown \\ \phantom{C_2H_5}\phantom{/}P\\ (CH_3)_2CH-CH_2-O\diagup\end{array}\!\!\!\overset{S}{\underset{\|}{}}\!-S-CH_2-\overset{O}{\underset{\|}{C}}-NH-N(CH_3)_2$ <br>(4) | 0.1<br>0.01<br>0.001 | 100<br>100<br>100 |

TABLE 2 — Continued (Plant-damaging insects)

(Myzus test)

| Active compounds | Concentration of active compound in percent | Degree of destruction in percent after 24 hours |
|---|---|---|
| 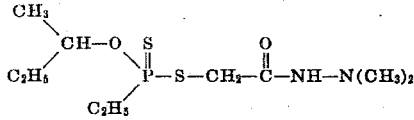 (5) | 0.1<br>0.01<br>0.001 | 100<br>100<br>100 |

EXAMPLE 3

Tetranychus Test

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from Table 3.

TABLE 3

(Plant-damaging mites)

(Tetranychus test)

| Active compounds | Concentration of active compound in percent | Degree of destruction in percent after 8 days |
|---|---|---|
| $(C_2H_5O)_2\overset{S}{\overset{\|}{P}}-S-CH_2-\overset{O}{\overset{\|}{C}}-NH-N(CH_3)_2$<br>(known) (A) | 0.1<br>0.01<br>0.001 | 98<br>50<br>0 |
| 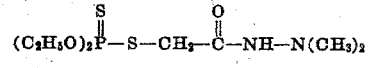 (known) (B) | 0.1<br>0.01<br>0.001 | 100<br>80<br>0 |
| 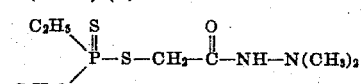 (6) | 0.1<br>0.01 | 100<br>100 |
| 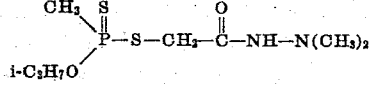 (3) | 0.1<br>0.01<br>0.001 | 100<br>100<br>70 |
| 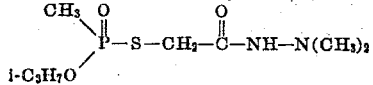 (1) | 0.1<br>0.01<br>0.001 | 100<br>98<br>98 |

EXAMPLE 4

Phaedon Larvae Test

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time the degree of destruction is determined as a percentage: 100 percent means that all beetle larvae are killed. 0 percent means that none of the beetle larvae are killed.

The active compounds, the concentration of the active compounds, the times of evaluation and the results can be seen from Table 4.

To produce a suitable preparation of active compound, 1 part by weight of active compound is mixed with the stated amount of solvent which contains the stated amount of emulsifier, and the concentrate is diluted with water to the desired concentration.

Bean plants (*Vicia faba*) are sprayed with the preparation of active compound until dripping wet.

After the specified periods of time, the plants are infested with cicadas (*Euscelis bilobatus*) and their mortality is in each case determined after 3 days. 100 percent means that all the cicadas were killed; 0 percent

TABLE 4
(Plant-damaging insects)
(Phaedon-larvae test)

| Active compounds | Concentration of active compound in percent | Degree of destruction in percent after 3 days |
| --- | --- | --- |
| $(C_2H_5O)_2\overset{S}{\overset{\|}{P}}-S-CH_2-\overset{O}{\overset{\|}{C}}-NH-N(CH_3)_2$ (known) (A) | 0.1 | 100 |
|  | 0.01 | 90 |
|  | 0.001 | 0 |
| $\begin{matrix}C_2H_5\\ \diagdown\\ \phantom{C_2H_5O}\end{matrix}\overset{S}{\overset{\|}{P}}-S-CH_2-\overset{O}{\overset{\|}{C}}-NH-N(CH_3)_2$ $C_2H_5O\diagup$ (known) (B) | 0.1 | 100 |
|  | 0.01 | 80 |
|  | 0.001 | 0 |
| $\begin{matrix}CH_3\\ \diagdown\end{matrix}\overset{S}{\overset{\|}{P}}-S-CH_2-\overset{O}{\overset{\|}{C}}-NH-N(CH_3)_2$ $i\text{-}C_3H_7O\diagup$ (6) | 0.1 | 100 |
|  | 0.01 | 100 |
| $\begin{matrix}CH_3\\ \diagdown\end{matrix}\overset{O}{\overset{\|}{P}}-S-CH_2-\overset{O}{\overset{\|}{C}}-NH-N(CH_3)_2$ $i\text{-}C_3H_7O\diagup$ (3) | 0.1 | 100 |
|  | 0.01 | 100 |
| $\begin{matrix}C_2H_5\\ \diagdown\end{matrix}\overset{S}{\overset{\|}{P}}-S-CH_2-\overset{O}{\overset{\|}{C}}-NH-N(CH_3)_2$ $i\text{-}C_3H_7O\diagup$ (1) PAT NO 3,696,174 | 0.1 | 100 |
|  | 0.01 | 100 |
|  | 0.001 | 100 |
|  |  | 816 |
| $\begin{matrix}C_2H_5\\ \diagdown\end{matrix}\overset{S}{\overset{\|}{P}}-S-CH_2-\overset{O}{\overset{\|}{C}}-NH-N(CH_3)_2$ $(CH_3)_2CH-CH_2-O\diagup$ (4) | 0.1 | 100 |
|  | 0.01 | 100 |
|  | 0.001 | 70 |

EXAMPLE 5

Euscelis Test (Lasting Effect After Spraying)
Solvent: 3 parts by weight acetone
Emulsifier: 1 part by weight alkylaryl polyglycol ether that none of the cicadas were killed.

The active compounds, the concentrations of the active compounds, the evaluation times and the results can be seen from Table 5.

TABLE 5
(Plant-damaging insects)
Lasting effect after spraying: *Euscelis bilobatus/Vicia faba*

| Active compounds | Percent active compound in the spray liquor | Percent destruction after— | | | | |
| --- | --- | --- | --- | --- | --- | --- |
|  |  | 6 days | 9 days | 13 days | 16 days | 20 days | 23 days |
| $\begin{matrix}C_2H_5\\ \diagdown\end{matrix}\overset{S}{\overset{\|}{P}}-S-CH_2-\overset{O}{\overset{\|}{C}}-NH-N(CH_3)_2$ $C_2H_5O\diagup$ (B) (known) | 0.05 | 100 | 90 | 80 | 30 | | |

TABLE 5 — Continued (Plant-damaging insects)

Lasting effect after spraying: *Euscelis bilobatus/Vicia faba*

| Active compounds | Percent active compound in the spray liquor | Percent destruction after— | | | | | |
|---|---|---|---|---|---|---|---|
| | | 6 days | 9 days | 13 days | 16 days | 20 days | 23 days |
| $\begin{array}{c} C_2H_5 \\ \diagdown \\ i\text{-}C_3H_7O \end{array} \overset{S}{\underset{\|}{P}}\text{—S—CH}_2\text{—}\overset{O}{\underset{\|}{C}}\text{—NH—N(CH}_3)_2$ (I) | 0.05 | 100 | 100 | 90 | 80 | 75 | 40 |

EXAMPLE 6

Tetranychus Test (Lasting Effect After Spraying)

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Bean plants (*Phaseolus vulgaris*), which have a height of approximately 10–30 cm., are sprayed with the preparation of the active compound until dripping wet.

After the specified periods of time, the plants are infested with spider mites (*Tetranychus urticae*) and their mortality is in each case determined after 3 days by counting the dead mites. The degree of destruction thus obtained is expressed as a percentage: 100 percent means that all the spider mites were killed; 0 percent means that none of the spider mites were killed.

The active compounds, the concentrations of the active compounds, the evaluation times and the results can be seen from Table 6.

To produce a suitable preparation of active compound, 1 part by weight of the active compound is mixed with the stated amount of solvent containing the stated amount of emulsifier and the concentrate is diluted with water to the desired concentration of 0.025 percent of active compound.

Bean plants (*Phaseolus vulgaris*) are watered with, in each case, 50 ml of the preparation of the active compound so that the preparation of active compound penetrates into the soil without wetting the leaves of the bean plants. The active compound is taken up by the bean plants from the soil and thus reaches the infested leaves.

After the specified periods of time, the plants are infested with thrips (*Hercinothrips femoralis*) and their mortality is in each case determined after 3 days. 100 percent means that all the thrips were killed; 0 percent means that none of the thrips were killed.

The active compounds, the concentrations of the active compounds, the evaluation times and the results can be seen from Table 7.

The following further examples are set forth to illustrate, without limitation, the process for producing the active compounds according to the present invention.

TABLE 6

(Plant-damaging mites)
Lasting effect after spraying: *Tetranychus urticae* (sensitive) *Phaseolus vulgaris*

| Active compounds | Percent active compound in the spray liquor | Percent destruction after— | | | | | | | |
|---|---|---|---|---|---|---|---|---|---|
| | | 3 days | 9 days | 16 days | 23 days | 30 days | 37 days | 44 days | 55 days |
| $\begin{array}{c} C_2H_5 \\ \diagdown \\ C_2H_5O \end{array} \overset{S}{\underset{\|}{P}}\text{—S—CH}_2\text{—}\overset{O}{\underset{\|}{C}}\text{—NH—N(CH}_3)_2$ (B) (known) | 0.05 | 100 | 100 | 98 | 90 | 50 | | | |
| $\begin{array}{c} C_2H_5 \\ \diagdown \\ \text{-}C_3H_7O \end{array} \overset{S}{\underset{\|}{P}}\text{—S—CH}_2\text{—}\overset{O}{\underset{\|}{C}}\text{—NH—N(CH}_3)_2$ (I) | 0.05 | 100 | 100 | 99 | 99 | 90 | | | |

EXAMPLE 7

Hercinothrips Test (Systemic Lasting Action)
Solvent: 3 parts by weight acetone
Emulsifier: 1 part by weight alkylaryl polyglycol ether

EXAMPLE 8

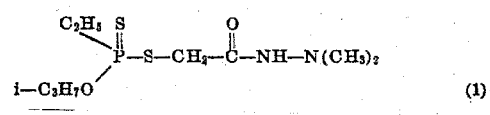

(I)

TABLE 7

(Plant-damaging insect)

Lasting effect after watering: *Hercinothrips femoralis: Phaseolus vulgaris*

| Active compounds | Mg. active compound to 100 g. soil (weighed air-dry) | Percent destruction after— | | | | | | |
|---|---|---|---|---|---|---|---|---|
| | | 13 days | 20 days | 27 days | 34 days | 41 days | 48 days | 52 days |
| $\underset{C_2H_5O}{\overset{C_2H_5}{>}}\!\!\underset{\parallel}{\overset{S}{P}}\!\!-\!S\!-\!CH_2\!-\!\underset{\parallel}{\overset{O}{C}}\!\!-\!NH\!-\!N(CH_3)_2$ (B) (known) | 12.5 | 100 | 100 | 100 | 60 | 50 | 30 | |
| $\underset{i-C_3H_7O}{\overset{C_2H_5}{>}}\!\!\underset{\parallel}{\overset{S}{P}}\!\!-\!S\!-\!CH_2\!-\!\underset{\parallel}{\overset{O}{C}}\!\!-\!NH\!-\!N(CH_3)_2$ (1) | 12.5 | 100 | 100 | 100 | 100 | 100 | 100 | 70 |

76.2 of chloroacetic acid phenyl ester dissolved in 200 ml acetonitrile are added at 20° to 30° C, with stirring, to a solution of 120 g (21 g excess) potassium O-isopropylethyldithiophosphonate in 400 ml acetonitrile. Stirring of the mixture is continued overnight at room temperature, the mixture is poured into water, the separated oil is taken up in benzene, the benzene solution is washed until there is a neutral reaction, the organic phase is dried over sodium sulphate, the drying agent is filtered off and the filtrate is concentrated. The yield of ethylthionothiolphosphonic acid O-isopropyl-S-(carbophenoxy)-methyl ester is 122.6 g (86.3 percent of the theory). To the intermediate product obtained, there is added at 20° to 30° C, with stirring, 46.1 g N,N-dimethylhydrazine. The reaction mixture is stirred overnight at room temperature; it is then taken up in dichloromethane, the solution is washed phenol-free with a dilute, cold solution of sodium hydroxide and then with water until there is a neutral reaction, the organic layer is dried over sodium sulphate, the drying agent is filtered off and the filtrate is concentrated. After expulsion of the solvent residues under reduced pressure, the ethylthionothiolphosphonic acid O-isopropyl-S-(N,N-dimethylaminocarbamyl)-methyl ester is obtained as a brown oil of refractive index $n_D^{24.5} = 1.5331$. The yield is 94.4 g (86.0 percent of the theory).

Analysis:
Calculated for $C_9H_{21}N_2O_2PS_2$ (molecular weight 284.4):
  P 10.88%; S 22.54%;
Found: 11.52%; 22.56%.

EXAMPLE 9

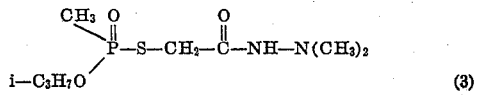

(3)

The compound is prepared analogously with that of Example 8 from potassium O-isopropyl-methylthiolphosphonate, bromo-acetic acid phenyl ester and N,N-dimethylhydrazine. Methylthiolphosphonic acid O-isopropyl-S-(N,N-dimethylaminocarbamyl)-methyl ester is obtained as a brown oil of refractive index $n_D^{22} = 1.5006$.

Analysis:
Calculated for $C_8H_{19}N_2O_3PS$ (molecular weight 254.3):
  P 12.18%; S 12.59%;
Found: 11.98%; 12.68%.

EXAMPLE 10

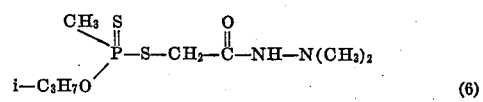

(6)

The compound is prepared analogously to that of Example 8 from sodium O-isopropyl-methyldithiophosphonate, chloroacetic acid phenyl ester and N,N-dimethylhydrazine. Methylthionothiolphosphonic acid O-isopropyl-S-(N,N-dimethyl-aminocarbamyl)-methyl ester is obtained as an almost colorless crystalline product of the melting point 55°C (from ligroin). Yield: 52.3% of the theory.

Analysis:
Calculated for $C_8H_{19}N_2O_2PS_2$ (molecular weight 270.4):
  P 11.45%; S 23.70%;
Found: 11.65%; 23.70%.

EXAMPLE 11

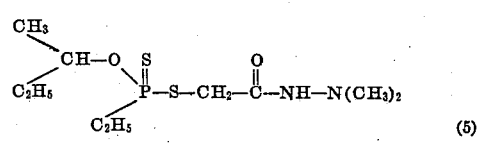

(5)

The compound is prepared analogously to that of Example 8 from sodium O-sec.-butyl-ethyl-dithiophosphonate, chloroacetic acid phenyl ester and N,N-dimethylhydrazine. Ethylthionothiolphosphonic acid O-sec.-butyl-S-(N,N-dimethyl-aminocarbamyl)-methyl ester is obtained as a brown oil of refractive index $n_D^{26} = 1.5305$. Yield: 95.3 percent of the theory.

Analysis:
Calculated for $C_{10}H_{23}N_2O_2PS_2$ (molecular weight 298.4):
  P 10.37%; S 21.47%;
Found: 10.29%; 21.32%.

EXAMPLE 12

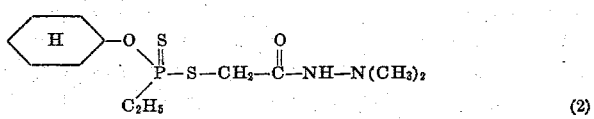

The compound is obtained analogously to that of Example 8 from sodium O-cyclohexyl-ethyl-dithiophosphonate, chloroacetic acid phenyl ester and N,N-dimethylhydrazine. Ethylthionothiolphosphonic acid O-cyclohexyl-S-(N,N-dimethylaminocarbamyl)-methyl ester is obtained as a brown oil of refractive index $n_D^{26} = 1.5428$ Yield: 91.6 percent of the theory.

Analysis:
Calculated for $C_{12}H_{25}N_2O_2PS_2$ (molecular weight 324.4):

| | P | S |
|---|---|---|
| | 9.56%; | 19.75%; |
| Found: | 9.90%; | 19.15%. |

EXAMPLE 13

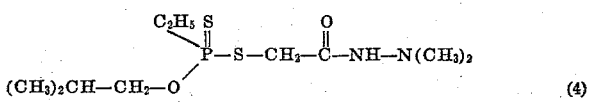

The compound is prepared analogously to that of Example 8 from sodium O-isobutyl-ethyl-dithiophosphonate, chloroacetic acid phenyl ester and N,N-dimethylhydrazine. Ethylthionothiolphosphonic acid O-isobutyl-S-(N,N-dimethylaminocarbamyl)-methyl ester is obtained as a brown oil of refractive index $n_D^{26} = 1.5290$. Yield: 93.9 percent of the theory.

Analysis:
Calculated for $C_{10}H_{23}N_2O_2PS_2$ (molecular weight 298.4)

| | P | S |
|---|---|---|
| | 10.37%; | 21.47%; |
| Found: | 10.63%; | 21.13%. |

EXAMPLE 14

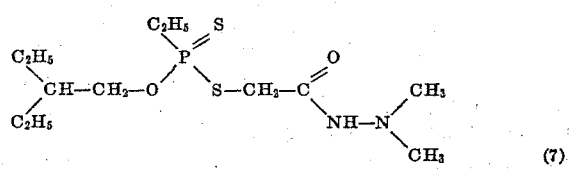

The compound is prepared analogously to that of Example 8 from sodium O-(2-ethyl)-butyl-ethyl-dithiophosphonate, chloroacetic acid phenyl ester and N,N-dimethylhydrazine. Ethylthionothiolphosphonic acid O-(2-ethyl)-butyl-S-(N,N-dimethylaminocarbamyl)-methyl ester is obtained as a brown oil of refractive index $n_D^{25} = 1.5247$. Yield: 88.9 percent of the theory.

Analysis:
Calculated for $C_{12}H_{27}N_2O_2PS_2$ (molecular weight 326.5):

| | P | S |
|---|---|---|
| | 9.50%; | 19.63%; |
| Found: | 9.62%; | 19.54%. |

EXAMPLE 15

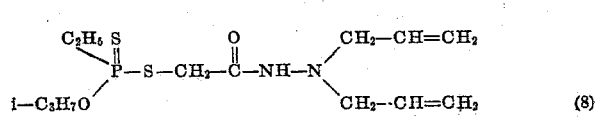

The compound is prepared, analogously to that of Example 8, from sodium O-isopropyl-ethyl-dithiophosphonate, chloroacetic acid phenyl ester and N,N-diallylhydrazine, with continuation of stirring for a longer period in the second reaction step. The ethylthionothiolphosphonic acid O-isopropyl-S-(N,N-diallylaminocarbamyl)-methyl ester is obtained as a yellowish oil of refractive index $n_D^{24.5} = 1.5340$. Yield: 76.4 percent of the theory.

EXAMPLE 16

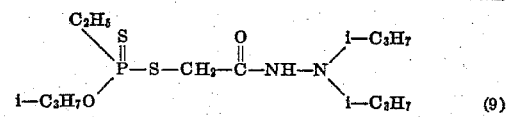

77.1 g (0.4 mole) chloroacetic acid N,N-diisopropyl-hydrazide dissolved in 300 ml acetonitrile are added dropwise at 30° to a solution of 82.5 g (0.4 mole + excess) sodium O-isopropyl-ethyldithiophosphonate in 400 ml acetonitrile. Stirring is conducted overnight, followed by taking up in benzene, washing neutral with water, drying over sodium sulphate, filtering and concentrating. After removal of solvent residues under reduced pressure, ethylthionothiolphosphonic acid O-isopropyl-S-(N,N-diisopropylaminocarbamyl)-methyl ester is obtained as a brown oil of refractive index $n_D^{25} = 1.5214$. Yield: 18.0 g (13.2 percent of the theory).

EXAMPLE 17

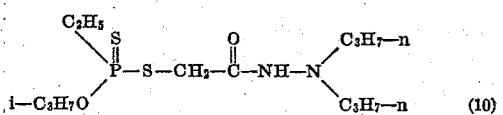

The compound is prepared, analogously to that of Example 8, from sodium O-isopropyl-ethyl-dithiophosphonate, chloroacetic acid phenyl ester and N,N-di-n-propylhydrazine, with continuation of stirring for a longer period in the second reaction step. Ethylthionothiolphosphonic acid O-isopropyl-S-(N,N-di-n-propylaminocarbamyl)-methyl ester is obtained as a light-brown oil of refractive index $n_D^{21} = 1.5112$. Yield: 82.3 percent of the theory.

EXAMPLE 18

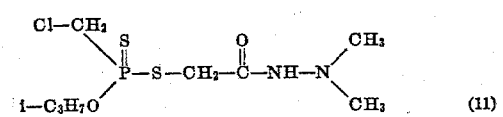

The compound is prepared, analogously to that of Example 8, from ammonium, O-isopropyl-chloromethyl-dithiophosphonate, chloroacetic acid phenyl ester and N,N-dimethylhydrazine. Chloromethylthionothiolphosphonc-O-isopopyl-S-(N,N-dimethyaminocarbamyl)-methyl ester is obtained as yellow crystals of melting point 68°–70°C.
Yield: 59.4 percent of the theory.

Analysis:
Calculated for $C_8H_{18}ClN_2O_2PS_2$

| | P | S |
|---|---|---|
| (molecular weight 304.8): | 10.17% | 21.07% |
| Found: | 10.75% | 21.48% |

EXAMPLE 19

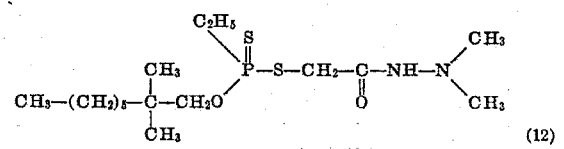

The compound is prepared, analogously to that of Example 8 from sodium O-2,2-dimethyloctyl-ethyldithiophosphonate, chloroacetic acid phenyl ester and N,N-dimethylhydrazine. Ethylthionothiolphosphonic acid O-2,2-dimethyloctyl-S-(N,N-dimethylaminocarbamyl)-methyl ester is obtained as a brown oil of refractive index $N_D^{24} = 1.5103$.
Yield: 85.5 percent of the theory.

Analysis:
Calculated for $C_{16}H_{35}N_2O_2PS_2$ (molecular weight 382.6):  P 8.10%  S 16.77%
Found:  P 8.02%  S 16.25%

As may be used herein, the terms "arthropod," "arthropodicidal and arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Alkyl- or aryl- thiolphosphonic acid O-alkyl-S-(N,N-dialkylaminocarbamyl)-methyl esters which have a branched O-alkyl or an O-cycloalkyl group, and their thionothiol analogues, of the formula $$\begin{array}{c} R \diagdown \;\; X \\ \phantom{R}P \diagup\!\!= \\ R'O \diagup \;\; S-CH_2-C(=O)-NH-N \diagup\!\!\diagdown R'' \;R''' \end{array} \quad (I)$$

in which
  R stands for optionally halogen-substituted lower alkyl
  R' stands for branched alkyl or cycloalkyl of up to 6 carbon atoms,
  R'' and R''' stand for lower alkyl or alkenyl, and
  X stands for oxygen or sulphur.

2. Compounds according to claim 1 in which R stands for alkyl with 1–4 carbon atoms which may be substituted by chlorine; R' stands for branched alkyl with 3–6 carbon atoms or for cyclohexyl and R'' and R''' stand for alkyl or alkenyl with 1–3 carbon atoms.

3. Compound according to claim 1 wherein such compound is ethylthionothiolphosphonic acid O-cyclohexyl-S-(N,N-dimethyl-aminocarbamyl)-methyl ester of the formula $$\text{C}_6\text{H}_{11}-\text{O}-\underset{\underset{\text{C}_2\text{H}_5}{|}}{\overset{\overset{\text{S}}{\|}}{\text{P}}}-\text{S}-\text{CH}_2-\overset{\overset{\text{O}}{\|}}{\text{C}}-\text{NH}-\text{N}(\text{CH}_3)_2 \quad (2)$$

4. Compound according to claim 1 wherein such compound is methylthiolphosphonic acid O-isopropyl-S-(N,N-dimethylaminocarbamyl)-methyl ester of the formula $$\underset{i-\text{C}_3\text{H}_7\text{O}}{\overset{\text{CH}_3}{\diagdown}}\underset{\diagup}{\overset{\overset{\text{O}}{\|}}{\text{P}}}-\text{S}-\text{CH}_2-\overset{\overset{\text{O}}{\|}}{\text{C}}-\text{NH}-\text{N}(\text{CH}_3)_2 \quad (3)$$

5. Compound according to claim 1 wherein such compound is ethylthionothiolphosphonic acid O-isobutyl-S-(N,N-dimethylaminocarbamyl)-methyl ester of the formula $$\underset{(\text{CH}_3)_2\text{CH}-\text{CH}_2-\text{O}}{\overset{\text{C}_2\text{H}_5}{\diagdown}}\underset{\diagup}{\overset{\overset{\text{S}}{\|}}{\text{P}}}-\text{S}-\text{CH}_2-\overset{\overset{\text{O}}{\|}}{\text{C}}-\text{NH}-\text{N}(\text{CH}_3)_2 \quad (4)$$

6. Compound according to claim 1 wherein such compound is ethylthionothiolphosphonic acid O-sec.-butyl-S-(N,N-dimethylaminocarbamyl)-methyl ester of the formula $$\underset{\text{C}_2\text{H}_5}{\overset{\text{CH}_3}{\diagdown}}\text{CH}-\text{O}-\underset{\underset{\text{C}_2\text{H}_5}{|}}{\overset{\overset{\text{S}}{\|}}{\text{P}}}-\text{S}-\text{CH}_2-\overset{\overset{\text{O}}{\|}}{\text{C}}-\text{NH}-\text{N}(\text{CH}_3)_2 \quad (5)$$

7. Compound according to claim 1 wherein such compound is ethylthionothiolphosphonic acid O-isopropyl-S-(N,N-dimethylaminocarbamyl)-methyl ester of the formula $$\underset{i-\text{C}_3\text{H}_7\text{O}}{\overset{\text{C}_2\text{H}_5}{\diagdown}}\underset{\diagup}{\overset{\overset{\text{S}}{\|}}{\text{P}}}-\text{S}-\text{CH}_2-\overset{\overset{\text{O}}{\|}}{\text{C}}-\text{NH}-\text{N}(\text{CH}_3)_2 \quad (1)$$

8. Compound according to claim 1 wherein such compound is methylthionothiolphosphonic acid O-isopropyl-S-(N,N-dimethylaminocarbamyl)-methyl ester of the formula $$\underset{i-\text{C}_3\text{H}_7\text{O}}{\overset{\text{CH}_3}{\diagdown}}\underset{\diagup}{\overset{\overset{\text{S}}{\|}}{\text{P}}}-\text{S}-\text{CH}_2-\overset{\overset{\text{O}}{\|}}{\text{C}}-\text{NH}-\text{N}(\text{CH}_3)_2 \quad (6)$$

* * * * *

UNITED STATES PATENT OFFICE
CERTIFICATE OF CORRECTION

Patent No. 3,705,927     Dated December 12, 1972

Inventor(s) Claus Stolzer et al

It is certified that error appears in the above-identified patent and that said Letters Patent are hereby corrected as shown below:

First page - under item [30], change priority date from "April 23, 1970" to -- April 23, 1969 -- .

Col. 1, line 10, cancel "arthropodicidal" and substitute therefor -- form -- .

Col. 13, Table 4, delete "Pat. No. 3,696,174" between Compounds (1) and (4).

Col. 20, lines 54 and 55, cancel "Chloromethylthonothiolphosphon c-O-isop opyl-SO(N,N-dimethy" and substitute therefore -- Chloromethylthionothiolphosphonic-O-isopropyl-S-(N,N-dimethyl -- .

Signed and sealed this 29th day of May 1973.

(SEAL)
Attest:

EDWARD M. FLETCHER, JR.       ROBERT GOTTSCHALK
Attesting Officer      Commissioner of Patents